United States Patent
Hershman (10) Patent No.: US 7,590,880 B1
(45) Date of Patent: Sep. 15, 2009

(54) CIRCUITRY AND METHOD FOR DETECTING AND PROTECTING AGAINST OVER-CLOCKING ATTACKS

(75) Inventor: Ziv Hershman, Tel Aviv (IL)

(73) Assignee: National Semiconductor Corporation, Santa Clara, CA (US)

( * ) Notice: Subject to any disclaimer, the term of this patent is extended or adjusted under 35 U.S.C. 154(b) by 973 days.

(21) Appl. No.: 10/939,977

(22) Filed: Sep. 13, 2004

(51) Int. Cl.
*G06F 1/04* (2006.01)

(52) U.S. Cl. .......................... 713/502; 380/203; 726/22; 726/23; 726/25; 726/34; 713/400; 713/401; 713/500; 713/501; 713/600; 713/601

(58) Field of Classification Search .................. 380/203; 713/502

See application file for complete search history.

(56) References Cited

U.S. PATENT DOCUMENTS

| | | | | |
|---|---|---|---|---|
| 5,991,415 A | * | 11/1999 | Shamir | 380/30 |
| 6,108,419 A | * | 8/2000 | LaMacchia et al. | 380/2 |
| 6,298,135 B1 | * | 10/2001 | Messerges et al. | 380/1 |
| 6,754,840 B2 | * | 6/2004 | Poisner | 713/500 |
| 6,965,673 B1 | * | 11/2005 | Boneh et al. | 380/28 |
| 2003/0065966 A1 | * | 4/2003 | Poisner | 713/500 |

OTHER PUBLICATIONS

Guilley, s., et al, 'Silicon-level Solutions to Counteract Passive and Active Attacks', Proc. Fifth Workshop Fault Tolerance and Detection in Cryptography (FDTC), in press, pp. 3-17, Aug. 2008, entire docuement, http://ieeexplore.ieee.org/stamp/stamp.jsp?arnumber=04599552.*

* cited by examiner

*Primary Examiner*—Kambiz Zand
*Assistant Examiner*—Ronald Baum (57) ABSTRACT

The present invention is directed to circuitry for detecting and protecting against over-clocking attacks on hardware modules. The circuitry preferably comprises a test signal, a delay path for providing a delayed signal of the test signal, and circuitry for comparing the logical state of the test signal and the delayed signal and issuing an attack indication whenever the signals are different.

20 Claims, 2 Drawing Sheets

CIRCUITRY AND METHOD FOR DETECTING AND PROTECTING AGAINST OVER-CLOCKING ATTACKS

TECHNICAL FIELD OF THE INVENTION

The present invention relates to the detection of, and the protection against, fault-based attacks on hardware modules such as cryptanalysis attacks and other attacks on data shielded within the hardware module. More particularly, the invention relates to a circuitry that provides protection against over-clocking (e.g., frequency, voltage and heat) attacks on cryptographic modules.

BACKGROUND OF THE INVENTION

The demand for increased security of electronic transactions is rapidly increasing due to the vast number of devices which are now adapted for communicating over data networks. Typically, a security module (e.g., TPM—Trusted Platform Module) employing cryptographic schemes is embedded into such applications (e.g., PC computers). for managing secret data and for protecting user's privacy. However, the wide acceptance of these devices has made the security schemes utilized by them more vulnerable to tampering and hacking attempts, which jeopardize the secret data and authenticity of transactions.

The security of security modules is maintained as long as the secret cryptographic keys embedded into them remain unrevealed. There are various techniques, such as side channel attacks ("New threat forces cryptography rethink", by Iain Thomson, http://www.vnunet.com, Oct. 10, 2002), that consider different information in an attempt to crack the code, (e.g., the time taken to perform an operation and how power consumption changes during that operation) that can be used for revealing the secret keys used by the security module to carry out its security tasks. Many of the side channel attacks are also based on studying characteristics of the security module and analyzing its functionality utilizing statistical analysis techniques, which may reveal the secret key, or portions thereof. However, these types of attacks that do not involve tampering with the hardware device are rather complex and do not guarantee successful results.

Another type of attack is fault-based cryptanalysis, which often involves direct physical attack of the hardware including the security module. In general, in such attacks the adversary (i.e., the attacker) aims to induce random computational errors (or any fault which may alter the data accessed by the module) during performance of security tasks, to obtain erroneous outputs. Typically, the errors are induced in such attacks by altering the power supply voltage/current, operating temperature, and/or the clock frequency of the security module, and/or by applying magnetic or electromagnetic radiation. This can be done for an extended period or as a 'glitch' i.e., for a short period of time at specific points of the device operation.

For example, the cryptographic key used in RSA implementations based on the CRT (Chinese Reminder Theorem) can be exposed utilizing a single erroneous result (R. A. Boneh et al, "*On the Importance of Checking Cryptographic Protocols for Faults*", Advances in Cryptology—Eurocrypt '97, LNCS 1233, Springer-Verlag, pp. 37-51, 1997) and thus CRT is rarely used nowadays due to this weakness. In fact, almost any secret key cryptosystem known so far is vulnerable to the Differential Fault Analysis (DFA) attacks ("*Differential Fault Analysis of Secret Key Cryptosystems*", Eli Biham and Adi Shamir, Lecture Notes in Computer Science, 1997).

Some of the common errors caused during fault-based cryptanalysis attacks are due to disruptions in the functionality of the device's synchronous (i.e., clock driven) modules, such as the CPU (Central Processing Unit). These disruptions are typically caused by violating the module's operating conditions requirements. Synchronous modules comprise paths of electronic elements that start and end at Flip-Flops (including input FF setup time, which is the time required for the input signal to be valid before the incoming clock edge, and output FF valid time which is a window of time during which the input must be valid and stable in order to assure valid data on the output). Each of these paths has a relative time delay characteristic (timing-path). Typically, the timing-path with the maximal delay dictates the envelop of proper operating conditions (e.g.,: the combination of clock frequency, temperature and voltage), at which the device/module operates properly. It should be noted, that in some cases a timing-path may be longer than one clock cycle, due to logic behavior of the sampling device. By heating and/or increasing clock frequency and/or lowering voltage and/or generating power and/or clock transients ("glitches") the attacker may cause a premature sampling of transient signals (signals that do not reflect the final propagation result of the path end). Generally, paths having longer delay times are more likely to fail under such attacks. As a result of such attacks, execution of the wrong instructions can be carried out, the result of which is unpredictable, e.g., it can cause effects such as ignoring data output limitations. Another type of attack is a denial of service (DoS) attack, when a user or organization is deprived of the services of a resource they would normally expect to have due to the inability of a particular network service, such as e-mail, to be available or the temporary loss of all network connectivity and services. During such attack, programming and data files may be destroyed, as well.

Some protection against certain fault-based attacks can be achieved by utilizing an internal clock and/or by blocking glitches by using a Low Pass Filter (LPF) at the clock input. However, the effectiveness of these countermeasures is limited since they can not take into account effects such as variations of voltage and temperature (unless significant timing margins are taken when designing the module). Moreover, the design of an LPF that can block small variations on the input clock is considered difficult. Another countermeasure is based on detecting the changes in the operating conditions of the protected module (or circuitry) by using voltage and/or heat sensors. While this type of protection is effective against many types of attacks, it requires careful considerations of the sensors' inaccuracies and additional hardware means (e.g., sensors, comparators), computational effort, and/or dedicated software, which may be required to implement it.

Another protection scheme, which can be implemented by hardware and/or software, is based on parity/redundancy verifications (error detection). This type of protection can be effectively used to verify the validity of data (see, for examples "*Improving Smart Card Security Using Self-Timed Circuits*", by S. Moore et al, Proc. ASYNC '02, 2002, pp. 211-218). However, these protection schemes may consume relatively large overhead in area, or may be weak in the sense of their error detection power, when applied for relatively large modules protection, depending on the specific design considerations.

Many of the countermeasures utilized nowadays are software solutions which are mainly based on checking intermediate and/or final results produced by security modules for faults, or improve the immunity of the module against certain types of attacks (e.g., U.S. Pat. No. 5,991,415 to Adi Shamir). However, these countermeasures add considerable computational time and effort to the operation of the security module which is unacceptable in many implementations.

There is an ongoing effort to provide protection against over-clocking attacks on cryptographic systems, and in particular there is a need for hardware means capable of detecting and protecting against such attacks.

BRIEF DESCRIPTION OF THE DRAWINGS

Features and advantages of the invention will become apparent in the following description of non-limiting exemplary embodiments, with reference to the accompanying drawings, in which like reference numerals represent like parts, and in which.

DETAILED DESCRIPTION

FIGS. 1A through 4, discussed below, and the various embodiments used to describe the principles of the present invention in this patent document are by way of illustration only and should not be construed in any way to limit the scope of the invention. Those skilled in the art will understand that the principles of the present invention may be associated with any suitably arranged cryptographic modules wherein protection against over-clocking (e.g., frequency, voltage and heat) attacks is desired.

To address the above-discussed deficiencies of the prior art, the present invention is directed to circuitry for detecting and protecting against over-clocking attacks on a hardware module. More particularly, the circuitry of the invention aims to protect against attacks attempting to induce timing violations, such as clock attacks (e.g., increasing clock frequency), heat attacks (e.g., warming the protected module), and voltage attacks (e.g., lowering its supply voltage), which are generally referred to herein as over-clocking attacks and which may be controlled by software or directly by tampering ("physically") with the module's circuitry and environment.

The circuitry of the invention preferably comprises a test signal, optionally provided by a Flip-Flop, a delay path for providing a delayed signal of the test signal, and circuitry, preferably a logical XOR gate, for comparing the logical state of the test signal provided via a direct path (i.e., with the minimal delay) and the delayed signal and issuing an attack indication whenever the signals are different.

The circuitry may further comprise protection means capable of halting the operation of portions of the, or of the entire, hardware module whenever an attack indication is issued. Preferably, the protection means changes the state of the module into an error state whenever an attack indication is issued. The protection means may be used to prevent any output from the hardware module, erase any data obtained or computed by the module, halt any further operation of the module, and/or erase any secret data maintained by the module, whenever an attack indication is issued or whenever it is in the error state.

In a preferred embodiment of the invention the delay time of the delay path is preferably greater than any legitimate propagation time of any single cycle timing path in the module. Optionally, the logical state of the test signal is toggled at the beginning of each clock cycle.

The circuitry may further comprise one or more additional delay paths and corresponding circuitries for comparing the logical state of the test signal and the corresponding delayed signal and issuing attack indications accordingly. An additional logical circuitry may be used for estimating the level of risk imposed by the attack according to the attack indications issued. This additional logical circuitry may be further used to erase any secret data maintained by the hardware module and/or prevent output of data, whenever high levels of risks are imposed by the attack.

The additional logical circuitry may be also used to perform defensive and corrective actions, such as enhancing FAN speed and/or reducing internal and/or external clock frequencies, whenever low levels of risks are imposed by the attack.

The circuitry may further comprise a Low Pass Filter at the module's clock input for protecting it against glitches. In addition, the circuitry may further comprise a first Flip-Flop for sampling the signals received on the delay path and a second Flip-Flop for sampling directly the test signal.

Moreover, an additional circuitry may be used for forcing the protected module to be in an error state and/or for issuing an alarm indication, whenever an attack is detected. This state may be locked upon receipt of an attack indication. Locking is optionally released upon receipt of a clear signal. The circuitry for sampling the attack indication preferably comprises a logical OR gate and a Flip-Flop for sampling the output signal from the OR gate, wherein the OR gate receives the attack indication and the signal is sampled by the Flip-Flop as an inputs and wherein the clear signal resets the Flip-Flop.

It therefore is an object of the present invention to provide hardware means for detecting, and protecting against, over-clocking attacks on hardware modules. It is another object to provide hardware means which can be embedded into digital circuitry cells of an integrated circuit, for detecting, and protecting against, over-clocking attacks on hardware modules. It is a further object to provide hardware means, for efficient and fast detection of over-clocking attacks of hardware modules, without utilizing dedicated sensors for indicating deviation of each element in the operating condition (e.g., temperature, frequency, and/or voltage.). It is a still another object to provide hardware means, for efficient and fast detection of over-clocking attacks of hardware modules, based on detecting timing violations during the operation of such modules. It is yet an additional object to provide hardware means, which does not require analysis of the operating conditions (e.g., temperature, voltage, etc.) of the hardware module, for efficient and fast detection of over-clocking attacks of hardware modules. Other objects and advantages of the invention will become apparent as the description proceeds.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; the term "module," "circuitry," and "controller" may be used interchangeably and mean any device, system or part thereof that controls at least one operation, such a device may be implemented in hardware, firmware or software, or some combination of at least two of the same. It should be noted that the functionality associated with any particular module, circuitry or controller may be centralized or distributed, whether locally or remotely; the term "Timing-path" refers to a signal propagation path through logic circuits and wires that start at Flip-Flop output and ends at a Flip-Flop input, including the valid time for. the output and setup time of the input, under a certain set of conditions such as voltage, temperature and process variations; "Single cycle timing-path" refers to a timing-path that is designed to consume no more than one clock cycle; "Timing violation"—refers to the case, were the time difference between a clock edge that determines the output(s) of a transmitting Flip-Flop in a timing path, and the clock edge that samples the input of a receiving Flip-Flop at the other end of the timing-path, is shorter than the time required for a signal to propagate through the timing-path; "Over-clocking" refers to a combination of one or more of voltage attacks, heating attacks and frequency attacks, each of which may cause timing violation; and "Error state" means a state during which outputs from the protected module are blocked, or during which the operation of the protected module is changed in response to certain attack indications. Definitions for certain words and phrases are provided throughout this patent document, those of ordinary skill in the art should understand that in many, if not most instances, such definitions apply to prior, as well as future uses of such defined words and phrases.

Design of efficient tamper-proof devices becomes an important issue in a wide range of implementations, in particular in cryptographic systems. The present invention provides hardware means for efficient detection and/or prevention of timing violations in hardware circuitry, such as induced during over-clocking attacks.

In these attacks the cryptographic keys of a security module can be exposed by obtaining one or more faulty outputs from the security module. The faulty outputs are typically obtained by altering the operating conditions (e.g., operating temperature, voltage, frequency, etc in a specific point in time or over a more extended period) of the device which induce errors during the computations it performs. For example, in such attacks, computational errors are caused in response to alterations of the clock pulses provided to the circuitry elements under attack. The present invention provides a testing circuitry for detecting timing violations (over clocking) in the operation of hardware circuitry and in response prevents further operation of the security module or takes other appropriate measures.

Figure 1A:
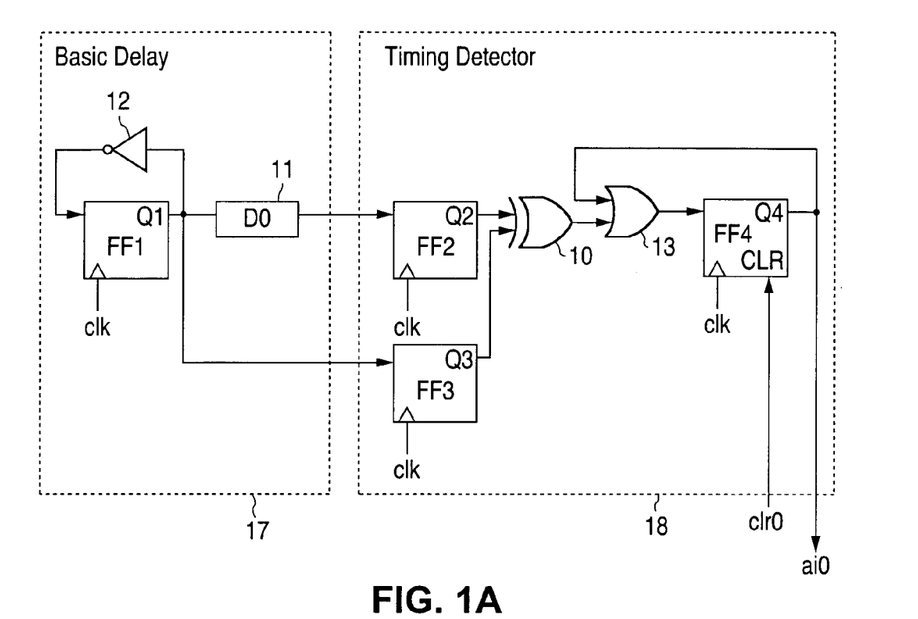
FIG. 1A illustrates a block diagram showing an advantageous embodiment of delay circuitry and timing detector in accordance with the principles of the present invention.

In general, the protection scheme of the present invention is based on testing the performance of a test-circuit and determining the existence of an attack, whenever a circuit behavior being indicative of an attack (that may potentially lead to a failure in the module operation) is detected. FIG. 1A illustrates a preferred embodiment of the invention for providing protection against over-clocking attacks by detecting timing violations during the operation of hardware circuitry. This preferred embodiment includes a Basic Delay 17 and a Timing Detector block 18. The Basic Delay (BD) 17 includes a Flip-Flop (FF), FF1, a Delay Unit (D0) 11, and inverter 12. The timing Detector (TD) block 18 includes a logical XOR gate 10, a logical OR gate 13, and Flip-Flops, FF2, FF3, and FF4.

Figure 1B:
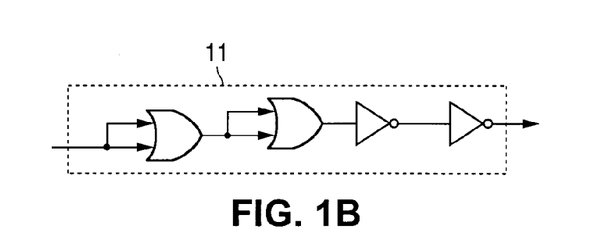
FIG. 1B illustrates an embodiment of a delay path.

FIG. 1B demonstrates a possible embodiment of a Delay path that can be used as a Delay Unit 11. The delay path D0 is a timing-path or a portion thereof. D0 delay should be longer (more time consuming) than the protected circuitry (module) critical (longest) functional path. Preferably, the delay path D0 is composed of the same components and implemented utilizing the same topology (e.g.: similar fan-out, number of logic levels, type of cells which are used to obtain the delay) as the protected circuitry critical path. That assures that both paths will respond in the same way to changes in operating conditions. It should be noted however, that it is possible to compensate for the different behavior, if different components are used, by taking an appropriate guard band. It is also recommended that the delay sub components (logic gates) will be equally distributed on the area of the protected module, in order to achieve responses to changes in voltage and temperature, which are essentially similar to the responses of the protected module to those changes.

The state of FF1 (Q1) is toggled in each clock cycle by providing it the inverted signal of Q1 as input. Of course, the toggling state of FF1 can be obtained in different ways, for example, a Toggled Flip-Flop (TFF) may be used for implementing FF1, and in this case inverter 12 is not required. The Delay Unit 11 provides the state Q1 of FF1 on its output with a delay time T0. The state Q1 is sampled by FF3, and the output of the Delay Unit D0 11 is sampled by FF2. The delay time T0 should be greater than any legitimate propagation time (timing-path) of signals in the protected circuitry.

Figure 3A:
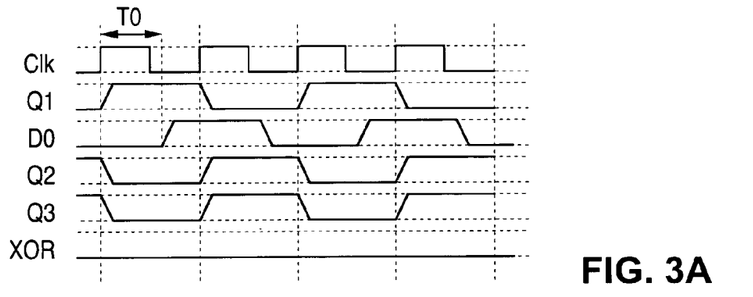
FIGS. 3A-3B illustrate timing diagrams of the protection circuitry signals during normal operation and under possible over-clocking attack.

The XOR gate 10 in TD 18 receives the state signals Q2 and Q3, of FF2 and FF3, as inputs, and provides an indication (HIGH logical state) whenever FF2 and FF3 are in different logical states. Of course, other kinds of digital comparators can be used to carry out the same task. The operation of BD 17 and TD 18 with proper timing and under possible attack conditions is illustrated in the timing diagrams shown in FIGS. 3A and 3B. As shown in FIG. 3A, when the protected circuitry is provided with clock pulse (clk) signal within the envelop of its operating conditions, both FF2 and FF3 (Q2 and Q3), sample the previous state of FF1 (Q1). Consequently, the output produced by the XOR gate 10 is in LOW logical state i.e., no attack indication on ai.

Figure 3B:
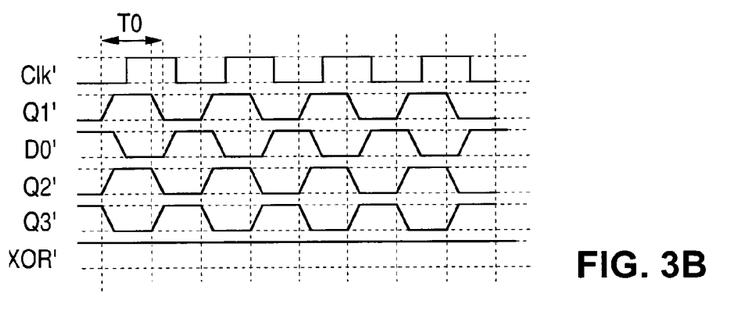

However, if the timing relation between the clock (clk') period and T0 is altered in a way that T0 is longer (more time consuming) than the clock period, as shown in FIG. 3B, the signal sampled by FF3 (Q3') reflects the previous state of FF1 (Q1'), but the signal sampled by FF2 (Q2') reflects the state of FF1 (Q1') during the preceding cycle, thus there is no correspondence between the states Q2' and Q3'. As a result, the output of the XOR gate 10 (XOR') is in HIGH logical state i.e., it provides an attack indication by asserting ai0. It should be noted that since the XOR gate 10 is a logical gate it might as well have output glitches of logical "1" during transitions of its inputs, and therefore the logical state of the ai0 output should be checked only according to the signals sampled by FF4.

The output provided by the XOR gate 10 is fed into one of the inputs of the logical OR gate 13, and the other input of the OR gate 13 is fed with. the state of FF4 (Q4). Whenever FF4 samples an attack indication provided by the XOR gate 10 (HIGH logical. state), it is locked in that state due to the logical OR operation performed by the OR gate 13. Of course, this lock can be obtained in different ways, for example, a synchronous Set-Reset Flip-Flop may be used for implementing the lock, and in this case, OR gate 13 is not required. This 'lock' mechanism of the state Q4 is used for halting any further operations of the protected circuitry and thereby protecting it against the attack. The locking of state Q4 may be released by resetting the state of FF4 via the CLR input.

The detection scheme of the invention demonstrated in FIG. 1A can be implemented in various ways, utilizing means or structures different than those exemplified. For example the Flip-Flops FF2 and FF3 can be removed in order to obtain faster response time, but at the price of reducing the maximal frequencies that the circuit is able to detect. Moreover, an additional Flip-Flop can be added in order to sample the output of the logical XOR gate 10, and provide the sampled states to the respective input of the logical OR gate 13

It is imperative that any. data obtained by the protected circuitry, will not be output there from. Moreover, any secured data obtained by the module may be erased when such attack indication is issued. The releasing of the locking of state of FF4 should be conditioned by a determination that the protected circuitry (module) and secured data are safe and are not under attack any more.

Figure 2:
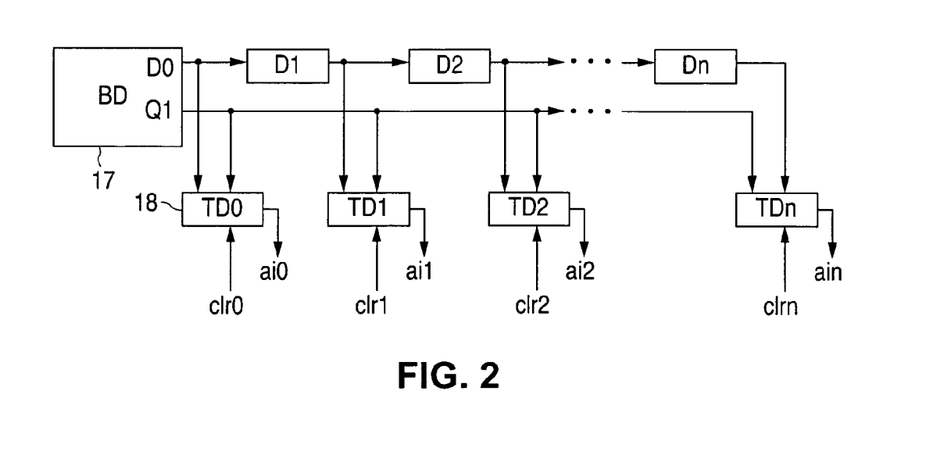
FIG. 2 illustrates a block diagram showing another embodiment of the invention in which several levels of timing violations are detected.

As shown in FIG. 2, the protection circuitry including the Basic Delay 17 (D0) and its corresponding Timing detector 18 (TD0), may be expanded to include multiple delay units, D1, D2, . . . , Dn, each of which increases the delay time to provide various additional delay times T1, T2, . . . , Tn. The outputs provided by the delay units, D1, D2, . . . , Dn, are fed into corresponding Timing Detectors, TD1, TD2, . . . , TDn, which utilize the state signal of Q1 for determining additional different levels of attacks and vulnerability, ai1, ai2, . . . , ain. In this embodiment of the invention the protection mechanism can be designed to provide different levels of protection corresponding to the different levels of attack indications, ai0 . . . ain. For example, the protection mechanism may be designed to issue a warning indication, and/or carry out further tests and/or change system parameters such as clock frequency and fan speed, when the levels of attack indications are low, and halt any further operation of the protected circuitry in response to high level of attack indications.

The protecting circuitry proposed by the invention, may be embedded into a plurality of circuitry cells of an Integrated Circuit (IC) design. The attack indications received from each protecting circuitry in such design may be used to evaluate the risks and determine a responsive course of action accordingly. For example, the operation of various portions of the IC may be halted in response to receipt of predetermined sets of attack indications, and the operation of the entire IC or portions thereof may be halted or irreversibly taken out of order in response to specific sets and/or levels of attack indications. Alternatively, all the secret data maintained by the IC may be erased if the level of attack indicates high risks to its secrets. For example:

1. attack of level 6 (e.g., assertion of ai6)—give indication to the system;
2. attack of level 5 (e.g., assertion of ai5)—increase fan speed;
3. attack of level 4 (e.g., assertion of ai4)—reduce clock frequency (external or internal);
4. attack of level 3 (e.g., assertion of ai3)—further reduce clock frequency;
5. attack of level 2 (e.g., assertion of ai2)—block outputs, reset the system; and
6. attack of level 1 (e.g., assertion of ai1 or ai0)—enter unrecoverable error state e.g., block outputs, erase all secrets from non volatile memory and then reset.

Figure 4:
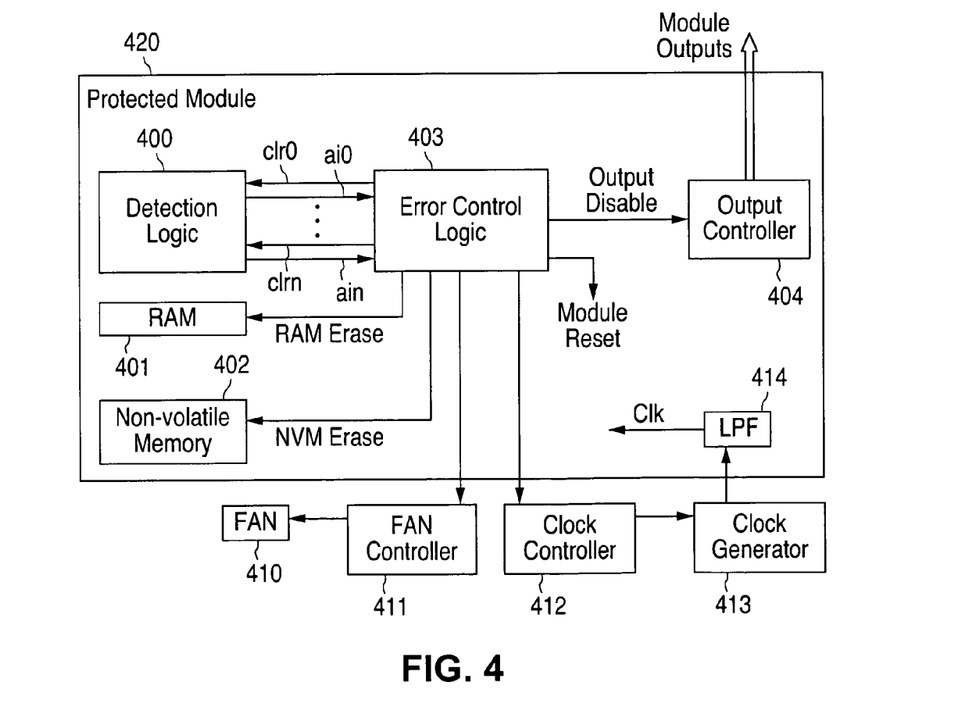
FIG. 4 illustrates. a block diagram demonstrating an implementation of the invention for protecting a module against over-clocking attacks.

FIG. 4 demonstrates a possible embodiment of a protection mechanism based on the attack detection scheme of the invention. In this example the Protected Module 420 includes a Detection Logic block 400 comprising logic circuitry for detecting various levels of attacks, as demonstrated in FIG. 2. The Error Control Logic 403 receives the attack indications, ai0, . . . , ain, produced by the Detection Logic 400, and carries out preconfigured action accordingly. The Error Control Logic also includes logic for clearing previously issued alarm indications once it is determined that some predefined conditions were fulfilled, and in response a respective clear signal, cir0, . . . , clrn, is issued.

The preconfigured actions may comprise issuing a "RAM Erase" signal to erase the content of RAM 401, issuing a "NVM Erase" signal to erase the content of Non-Volatile Memory 402, issuing an "Output Disable" signal to block all of the module's outputs via the Output Controller 404, issuing signals instructing the Fan Controller 411 to increase/decrease the speed of Fan 410, issuing signals instructing the Clock Controller 412 to change the frequency of the Clock Generator 413, and/or issuing a "Module Reset" signal for resetting the operation of the Protected Module 420.

This embodiment of the invention may also comprise an. LPF 414, which provides additional protection. The LPF 414 filters the clock pulses received from the Clock Generator 413, and in this way eliminates glitches and extremely high frequency pulses that may not be detected by the Detection Logic 400.

The Error Control Logic 403 can be designed to handle various attack scenarios and carry out corresponding preventive actions in order to secure the Protected Module 420. For example, the Error Control Logic 403 may adjust the frequency of the Clock Generator 413, by providing the Clock Controller 412 corresponding instructions, in response to certain levels of attack. For instance, in case when the Error Control Logic 403 determines that the frequency of the Clock Generator 413 should be reduced, it configures the Clock Controller 412 accordingly. Once the clock frequency reduction is completed, respective signals (e.g., clrn) are issued for resetting the corresponding TD units (e.g., TDn) that issued the Alert Indication.

The above examples and description have of course been provided only for the purpose of illustration, and are not intended to limit the invention in any way. As will be appreciated by the skilled person, the invention can be carried out in a great variety of ways, employing techniques different from those described above, all without exceeding the scope of the invention. It is intended that the present invention encompass such changes and modifications as fall within the scope of the appended claims.

What is claimed is:

1. An apparatus for detecting and protecting against overclocking attacks of a hardware module, comprising:
    a delay path configured to generate a toggling signal, responsive to a system clock signal, and delaying the toggling signal to produce a delayed toggling signal; and
    a timing detector configured to compare the toggling signal and the delayed toggling signal and generating an attack indication whenever the signals are different.

2. The apparatus of claim 1, further comprising an error controller configured to use the attack indication to at least one of:
    change a state of the hardware module to an error state;
    halt operation of at least a portion of the hardware module,
    adjust the operation of at least a portion of the hardware module;
    prevent output of data by the hardware module;

erase data in at least one memory associated with the hardware module; and reset the hardware module.

3. The apparatus of claim 1, wherein the delay path is configured to delay the toggling signal by introducing a delay into the toggling signal, the delay greater than any legitimate propagation time of signals in the hardware module.

4. The apparatus of claim 1, wherein the delay path comprises:

a flip-flop having a first input configured to receive a clock signal, a second input, and an output configured to provide the toggling signal;

an inverter configured to receive the toggling signal and to provide an inverted toggling signal to the second input of the flip-flop; and a delay unit configured to receive the toggling signal and to generate the delayed toggling signal.

5. The apparatus of claim 4, wherein the delay unit comprises:

a first OR gate having two inputs that are both configured to receive the toggling signal;

a second OR gate having two inputs that are both configured to receive an output of the first OR gate;

a first inverter having an input configured to receive an output of the second OR gate; and a second inverter having an input configured to receive an output of the first inverter.

6. The apparatus of claim 1, wherein the timing detector comprises:

a first flip-flop having a first input configured to receive a clock signal and a second input configured to receive the toggling signal;

a second flip-flop having a first input configured to receive the clock signal and a second input configured to receive the delayed toggling signal;

a first XOR gate having a first input configured to receive an output of the first flip-flop and a second input configured to receive an output of the second flip-flop;

a second XOR gate having a first input configured to receive an output of the first XOR gate and a second input; and a third flip-flop having a first input configured to receive the clock signal, a second input configured to receive an output of the second XOR gate, and an output coupled to the second input of the second XOR gate.

7. The apparatus of claim 6, further comprising an error controller configured to clear the third flip-flop.

8. The apparatus of claim 1, wherein:

the delay path comprises a first delay path and the delayed toggling signal comprises a first output signal;

the timing detector comprises a first timing detector and the attack indication comprises a first attack indication; and the apparatus further comprises:

at least one additional delay path, wherein each additional delay path is configured to receive an input signal and delay the input signal to produce an additional output signal, wherein the input signal to each additional delay path comprises the output signal from a preceding delay path; and at least one additional timing detector, each additional timing detector configured to receive the additional output signal from one additional delay path and to generate an additional attack indication.

9. The apparatus of claim 8, further comprising an error controller configured to:

use the multiple attack indications to estimate a level of risk; and perform at least one protective action based on the level of risk.

10. The apparatus of claim 9, wherein the at least one protective action comprises at least one of:

preventing output of data by the hardware module when the level of risk is higher;

erasing data in at least one memory associated with the hardware module when the level of risk is higher;

adjusting a fan speed when the level of risk is lower; and adjusting a clock frequency when the level of risk is lower.

11. A protected module, comprising:

an output controller configured to control output of data from the protected module;

an attack detector configured to detect an over-clocking attack against the protected module, the attack detector configured to:

generate a toggling signal responsive to a system clock signal;

delay the toggling signal to produce a delayed toggling signal;

compare the toggling signal and the delayed toggling signal; and generate an attack indication whenever the signals are different; and an error controller configured to adjust operation of the protected module based on the attack indication.

12. The protected module of claim 11, wherein the error controller is coupled to:

a fan controller configured to control a speed of a cooling fan; and a clock controller configured to control a clock generator, the clock generator configured to produce a clock signal.

13. The protected module of claim 12, wherein the error controller is configured to adjust the operation of the protected module by at least one of:

disabling the output of data using the output controller;

erasing data in at least one memory in the protected module;

resetting the protected module;

adjusting the speed of the cooling fan using the fan controller; and adjusting a frequency of the clock signal produced by the clock generator using the clock controller.

14. The protected module of claim 11, wherein the attack detector is configured to:

delay the toggling signal by different amounts to produce a plurality of delayed toggling signals;

compare the toggling signal and the plurality of delayed toggling signals; and generate a plurality of attack indications.

15. A method, comprising:

generating a toggling signal responsive to a system clock signal;

delaying the toggling signal to produce a delayed toggling signal;

comparing the toggling signal and the delayed toggling signal;

generating an attack indication whenever the signals are different; and adjusting operation of a protected module based on the attack indication.

16. The method of claim 15, wherein adjusting the operation of the protected module comprises at least one of:

changing a state of the protected module to an error state;

halting operation of at least a portion of the protected module;

preventing output of data by the protected module;

erasing data in at least one memory associated with the protected module; and resetting the protected module.

17. The method of claim 15, wherein delaying the toggling signal comprises introducing a delay into the toggling signal, the delay greater than any legitimate propagation time of signals in the protected module.

18. The method of claim 15, further comprising:

producing at least one additional delayed toggling signal; and generating at least one additional attack indication using the at least one additional delayed toggling signal;

wherein adjusting the operation of the protected module comprises adjusting the operation of the protected module based on the multiple attack indications.

19. The method of claim 18, wherein adjusting the operation of the protected module based on the multiple attack indications comprises:

using the multiple attack indications to estimate a level of risk; and adjusting the operation of the protected module based on the level of risk.

20. The method of claim 19, wherein adjusting the operation of the protected module based on the level of risk comprises at least one of:

preventing output of data by the protected module when the level of risk is higher;

erasing data in at least one memory associated with the protected module when the level of risk is higher;

adjusting a fan speed when the level of risk is lower; and adjusting a clock frequency when the level of risk is lower.

* * * * *

UNITED STATES PATENT AND TRADEMARK OFFICE
CERTIFICATE OF CORRECTION

| | | |
|---|---|---|
| PATENT NO. | : 7,590,880 B1 | |
| APPLICATION NO. | : 10/939977 | |
| DATED | : September 15, 2009 | |
| INVENTOR(S) | : Ziv Hershman | |

It is certified that error appears in the above-identified patent and that said Letters Patent is hereby corrected as shown below:

Column 2, line 59, delete "examples" and replace with --example--;

Column 3, line 29, delete "." after the term "illustrates";

Column 5, line 17, delete "." after the term "for";

Column 6, line 45, delete "ai" and replace with --ai0--;

Column 6, line 47, delete "TO" and replace with --T0-- (both occurrences);

Column 6, line 62, delete "." after the term "with";

Column 7, line 15, delete "." after the term "any";

Column 8, line 23, delete "." after the term "an"; and

Column 8, claim 2, line 64, delete "," after the term "module" and replace with --;--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,590,880 B1  
APPLICATION NO.   : 10/939977  
DATED             : September 15, 2009  
INVENTOR(S)       : Ziv Hershman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1402 days.

Signed and Sealed this

Twenty-first Day of September, 2010

David J. Kappos  
*Director of the United States Patent and Trademark Office*